Nov. 13, 1951   R. P. PIPEROUX ET AL   2,574,588
SHEET POLISHING APPARATUS AND PROCESS
Filed May 12, 1948   5 Sheets-Sheet 1

INVENTORS.
RENE P. PIPEROUX.
WILLIAM P. MOELLER.
BY DAVID B HERTZ.
ATTORNEYS

INVENTORS
RENE P. PEPEROUX.
WILLIAM P. MOELLER.
BY DAVID B. HERTZ.

ATTORNEYS

Nov. 13, 1951    R. P. PIPEROUX ET AL    2,574,588
SHEET POLISHING APPARATUS AND PROCESS
Filed May 12, 1948    5 Sheets-Sheet 4

INVENTORS
RENE P. PIPEROUX
WILLIAM P. MOELLER
DAVID B. HERTZ.
BY
ATTORNEYS

Patented Nov. 13, 1951

2,574,588

UNITED STATES PATENT OFFICE 2,574,588

SHEET POLISHING APPARATUS
AND PROCESS

Rene P. Piperoux, Radburn, N. J., and William P. Moeller, Baldwin, and David B. Hertz, New York, N. Y., assignors to Celanese Corporation of America, a corporation of Delaware Application May 12, 1948, Serial No. 26,636

10 Claims. (Cl. 18—6)

This invention relates to a sheet polishing machine and relates more particularly to an improved apparatus for the production of continuous, highly polished sheet materials of any desired thickness having a basis of a thermoplastic material.

Sheet materials having a basis of a thermoplastic material are formed by various processes well known to the art. The particular process which is employed for the production of any given sheet material is governed to a substantial degree by the width and thickness desired in the finished sheet material. In the case of relatively thin films and foils, solvent casting operations are usually employed wherein the thermoplastic base material is dissolved in a suitable combination of volatile solvents containing one or more plasticizers and the solution or dope thus obtained is then cast in the form of a thin film on to the surface of a highly polished revolving drum or wheel. The volatile solvents are vaporized as the drum or wheel revolves leaving a thin plasticized film or foil of the thermoplastic material on the surface of the wheel or drum. The film or foil formed in this manner is continuously stripped from the drum or wheel and taken up usually in the form of rolls. Films and foils possessing a high gloss and of practically any desired length or width may thus be obtained. The width is governed only by the lateral dimension of the wheel or drum on which the dope or solution is cast.

Thick sheets of thermoplastic material are usually formed by block-pressing operations. The thermoplastic material, in combination with the desired plasticizers, is first molded under heat and high pressure to form a solid block, which may be several inches in thickness. After the block has been suitably aged to ensure complete homogeneity, sheets of any desired thickness are cut therefrom by means of a suitable knife blade. The sheets are then polished to remove the knife lines present by stacking the sheets between smooth-surfaced plates in a multiple platen press and then subjecting the assembly to heat and high pressure. The maximum dimensions of the polished sheets which may be formed in this manner are limited because of the practical limitations in the chase and press sizes available. Presses capable of accommodating very large sheets are extremely costly and therefore uneconomic. By extrusion processes, it is, of course, possible to produce relatively thick sheet materials in any desired length whose width is governed by the size of the slit through which said sheet materials are extruded. However, the sheet materials produced by extrusion processes do not approach the uniformity and high surface quality obtained by platen press polishing and, up to the present, such press polishing has been essential for the productioin of sheet materials of high surface quality.

It is, therefore, an important object of this invention to provide an improved apparatus for the production of highly polished sheet materials in continuous form from continuously extruded sheet materials having a basis of a thermoplastic material.

Another object of this invention is the provision in apparatus for the production of continuous, highly polished sheets of a thermoplastic material of means capable of being adjusted before or during polishing operations for the purpose of varying the continuous polished sheets.

A further object of this invention is the provision of a novel process for the production of continuous, highly polished sheet material of any desired thickness having a basis of a thermoplastic sheet-forming material.

Other objects of this invention will appear from the following detailed description and the accompanying drawings.

In the drawing wherein a preferred embodiment of our invention is shown.

Like reference numerals indicate like parts throughout the several views of the drawings.

Figures 1, 2:
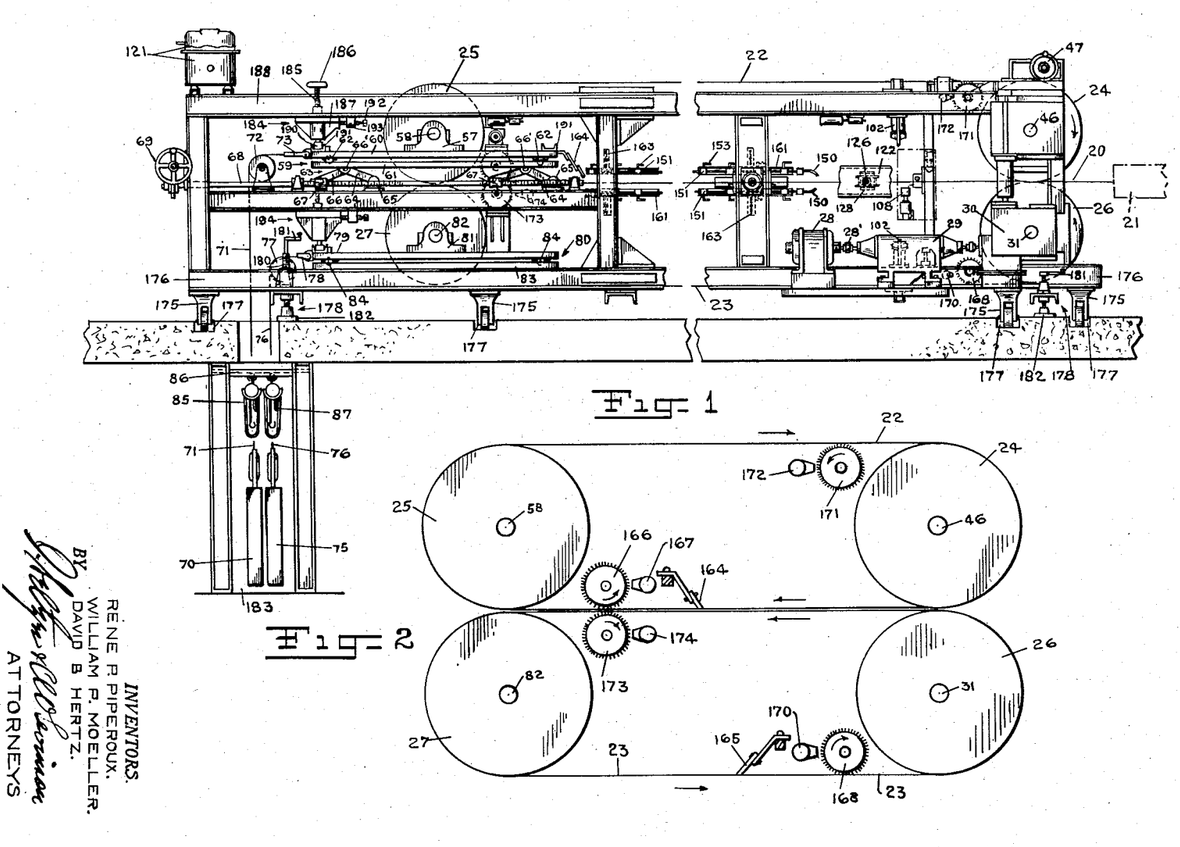
Fig. 1 is a side-elevation view of the novel sheet polishing apparatus of our invention.
Fig. 2 is a side-elevational view on an enlarged scale, of the means employed for cleaning the belts.

Referring now to the drawings, and more particularly to Fig. 1, a sheet 20 of a thermoplastic material formed by extruding a solution of thermoplastic material through a slit in an extrusion head 21 is passed into the nip of a pair of endless, highly polished belts 22 and 23. Upper belt 22 passes around a driven pulley 24 and a tensioned idler pulley 25, pulley 24 being rotated in the direction shown by the arrow. Lower belt 23 is driven by a pulley 26 which rotates in the direction shown by the arrow, the opposite end of belt 23 passing over a tensioned idler pulley 27. Driven pulleys 24 and 26 as well as idler pulleys 25 and 27 are heated by any suitable heating means (not shown) so that the endless belts 22 and 23 which are in contact therewith will also be heated and will maintain the thermoplastic sheet material therebetween in a thermoplastic condition. The action of the heat and pressure exerted on the thermoplastic material by polished belts 22 and 23 polishes the surfaces of said sheet material. Highly polished, continuous thermoplastic sheet materials are thus formed. The finished sheet material is continuously discharged from the nip of pulleys 25 and 27 and is then passed to a suitable take-up or cutting device (not shown) so that either continuous rolls or sheets of any desired length may be produced.

Figures 3, 11, 12:
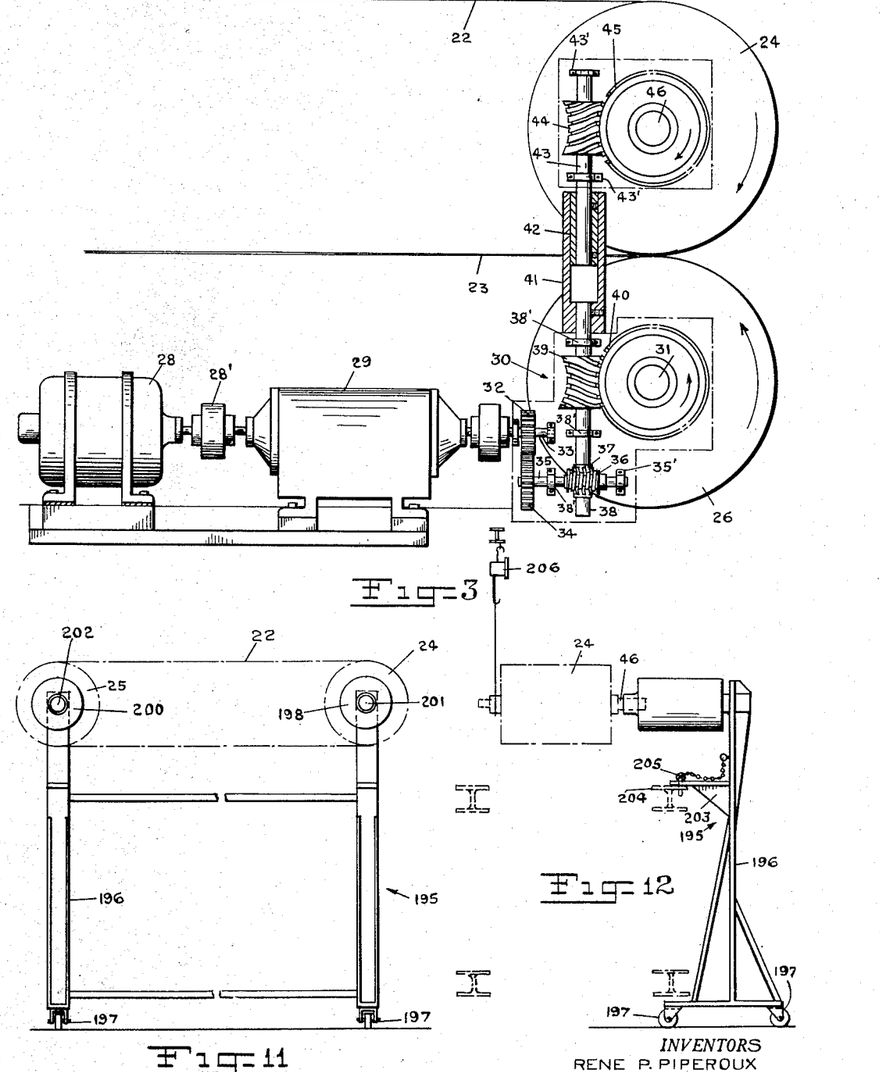
Fig. 3 is a detail view, partly in section, of the belt driving means.
Fig. 11 is a side-elevational view of a movable frame adapted to be employed for transporting the polishing belts to and from the sheet polishing apparatus.
Fig. 12 is an end view of said movable frame.

As shown in detail in Fig. 3, a direct geared drive is provided for driving pulleys 24 and 26. The pulley drive means comprises an electric motor 28 operatively connected by any suitable connection 28' to a speed changer 29 (hydraulic) to provide variable speed takeoff, which through a covered gear drive assembly, generally indicated by reference numeral 30, rotates a shaft 31 upon which pulley 26 is mounted. The gear drive assembly 30 includes a gear 32 fixed to and driven by output shaft 33 of speed changer 29 which meshes with a gear 34 keyed to a shaft 35 journaled in trunnions 35'. Keyed to shaft 35 is a worm 36 which meshes with a worm gear 37 fixed to vertical shaft 38 journaled in trunnions 38'. Mounted on shaft 38 is a cone pinion drive gear 39 which meshes with a gear 40 keyed to the shaft 31 of pulley 26. The rotation and cooperation of the train of gears described causes pulley 26 to rotate thus driving lower belt 23.

Upper pulley 24 and belt 22 are also driven by the rotation of vertical shaft 38 through the action of a sliding power transfer assembly cooperating therewith. The power transfer assembly comprises a sleeve 41 keyed to vertical shaft 38. A bushing 42 is splined to sleeve 41 and is also keyed to a short shaft 43 journaled in trunnions 43'. Shaft 43 carries a cone pinion gear 44 which meshes with a gear 45 keyed to the shaft 46 upon which pulley 24 is mounted. This arrangement enables the distance between pulleys 24 and 26 and belts 22 and 23 to be increased or decreased without interfering with the action of the driving means. Thus, pulleys 24 and 26 and belts 22 and 23 may be driven at a uniform, constant speed and any variation in their relative speed which would distort the surface of the thermoplastic sheet material being polished is entirely avoided.

Figure 4:
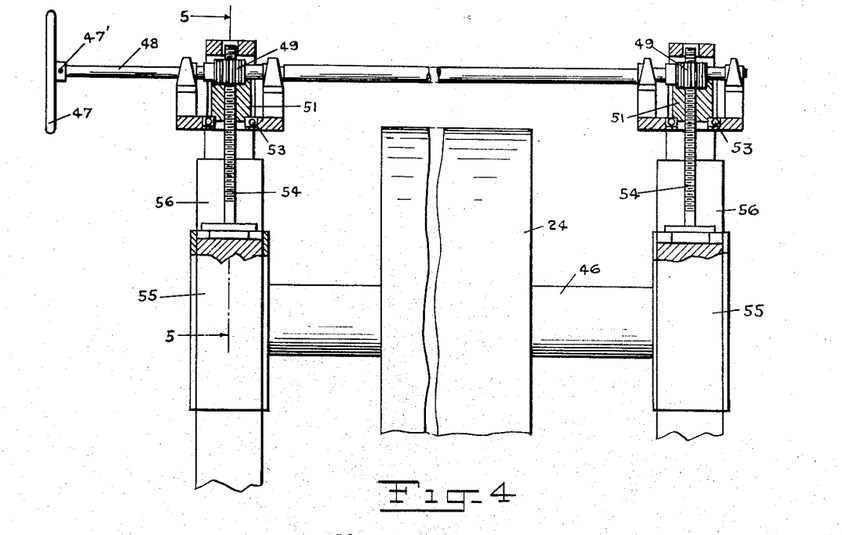
Fig. 4 is an end view, partly in section, of the means provided for increasing or decreasing the distance between the polishing belt surfaces.
Figure 5:
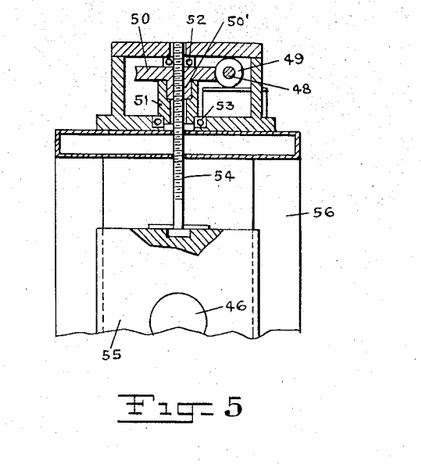
Fig. 5 is a cross-sectional view of a portion of said belt adjusting means taken along line 5—5 in Fig. 4.

The nip or distance between pulleys 24 and 26 and belts 22 and 23 may be increased or decreased, as desired, by the operation of suitable adjusting means, which is more particularly shown in Figs. 4 and 5. Thus, pulley 24 may be raised or lowered by turning a hand wheel 47 fixed, as by a set screw 47', to a shaft 48 carrying worms 49 which mesh with worm wheels 50, as shown in Fig. 5. Worm wheels 50 are provided with internally threaded hubs 50' on which hubs are mounted sleeves 51. Ball bearings 52 and 53 are provided to make for easy rotational movement. The rotation of worm wheels 50 and sleeves 51 imparts a vertical movement to shafts 54, which are threaded, through hubs 50'. The lower ends of shafts 54 are attached to bearing blocks 55. Accordingly, the vertical movement of shafts 54 raises or lowers bearing blocks 55 which are movable in ways 56 and in which bearing blocks the shaft 46 of pulley 24 is journaled. The movement of bearing blocks 55 may thus be caused to vary the nip between pulley 24 and pulley 26, thus permitting sheet materials of variable thickness to be accommodated between polishing belts 22 and 23.

Any variation in the dimensions of the nip of pulleys 24 and 26 requires a substantially corresponding change in the dimensions of the nip between idler pulleys 25 and 27 from which the polished thermoplastic sheet material is discharged and suitable means are provided for varying the distance between said pulleys as shown in Fig. 1, this change in the relative position of the pulleys 25 and 27 may be effected by raising or lowering upper idler pulley 25. To enable the raising or lowering to be effected conveniently, bearing blocks 57 in which the shaft 58 of pulley 25 is journaled are supported on a cradle, generally indicated by reference numeral 59, comprising an upper section 60 on which bearing blocks 57 are carried and a lower section 61. Upper and lower sections 60 and 61 are separated by grooved rollers 62 which allow for relative horizontal movement between said sections. Lower section 61 rests on a plurality of toggles, two of which are shown generally indicated by reference numeral 63. Each of the toggles 63 consists of an arm 64 pivotally attached at their lower ends to a fixed boss 65 and at their upper ends to a pivot 66' and a movable arm 66 pivoted at its lower end on an internally threaded sleeve 67 movable along a rotatable screw 68, operated by a handwheel 69 through suitable means (not shown). By rotating handwheel 69, screw 68 is caused to turn thus moving sleeves 67 either to the right or left, as the case may be. This movement decreases or increases the angle between the toggle arms 64 and 66, raising or lowering the cradle 59 and with it pulley 25.

Suitable tensioning means are also provided to maintain polishing belts 22 and 23 absolutely taut during polishing operations to avoid any deformation of the thermoplastic sheet material which may be caused by any slack in said polishing belts. Thus, belt 22 is maintained under tension by means of a heavy weight 70 attached to a cable 71 which passes over a rotatably mounted wheel 72. Cable 71 is anchored in a link 73 pivotally attached to the upper section 60 of cradle 59. The gravitational pull of weight 70 thus applies a constant tension to belt 22 and acts to maintain said belt in a taut condition. Tensioning of lower belt 23 is achieved through the action of a second weight 75 attached to a cable 76 which passes over a rotatably mounted wheel 77 and is anchored in a link 78 pivotally attached to the upper section 79 of a cradle 80 which supports bearing block 81 in which shaft 82 of the pulley 27 is journaled. The cradle 80 also includes a lower section 83 attached to the frame of the apparatus and separated from the upper section 79 by grooved rollers 84, which arrangement permits of relative horizontal movement between the upper and lower sections of said cradle 80. The belt tensioning action of weight 70 on cable 71 may be relieved, for reasons which will hereinafter be given in detail, by means of a block and tackle generally indicated by reference numeral 85, suspended from a fixed, crossbeam 86. The tension of weight 75 on cable 76 may be released by bringing block and tackle 87 into play, the latter also being suspended from the fixed cross-beam 86.

Figure 6:
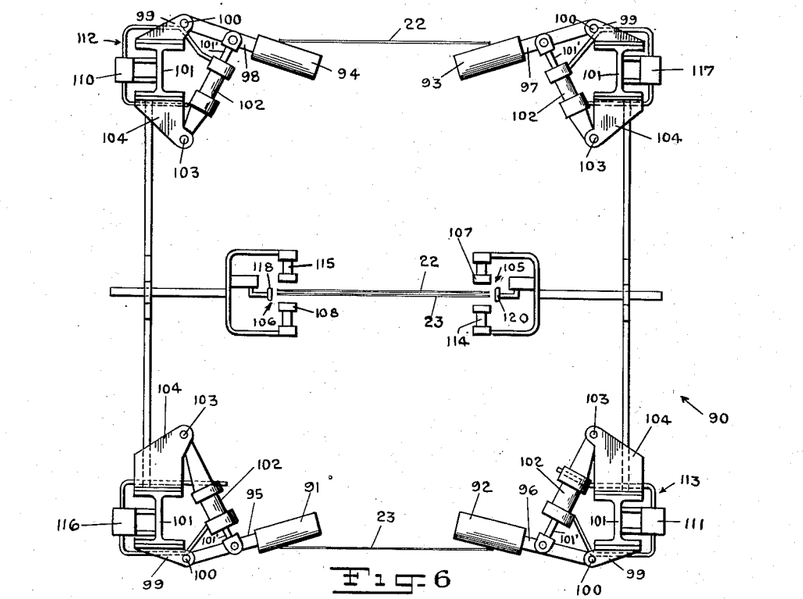
Fig. 6 is an end view of a hydraulically controlled belt training means including scanning photoelectric cells, which means is provided for training the polishing belts and preventing any excessive lateral movement thereof.

In order to maintain belts 22 and 23 registered and in alignment during the polishing operation so that any distortion of the surface of the sheet material being polished, occasioned by the tracking or shifting of said belts from side to side, is minimized, there is provided a belt training mechanism shown in Fig. 6 and generally indicated by reference numeral 90. The belt training mechanism 90 comprises a plurality of training rolls 91, 92, 93 and 94 rotatably mounted on shafts 95, 96, 97 and 98, respectively, which shafts are pivotally attached to the several brackets 99 at the points 100. Rolls 91 and 92 are in rolling contact with lower belt 23 while upper rolls 93 and 94 are in rolling contact with upper belt 22. Brackets 99 are attached to I-beams 101 which constitute a portion of the frame of the polishing apparatus. Each of shafts 95, 96, 97 and 98 may be moved about pivots 100 by the movement of a hydraulically operated piston 101' movable in each of hydraulic cylinders 102. The means causing the movement of said pistons will be described hereinafter in detail. The opposite ends of hydraulic cylinders 102 are pivotally mounted at 103 in brackets 104 which are also attached to the I-beams 101 of the machine frame.

Any lateral movement or tracking of belt 22 to the left for example, will force belt 22 against roller 94 which creates an unbalanced tension on said belt 22. This shift in the position of belt 22 to the left will also result in said belt 22 moving out of register or alignment with belt 23, thus exposing at point 105 a narrow strip of the upper highly polished outside surface of belt 23, and a narrow strip of the lower highly polished outside surface of belt 22 at point 106. The slight exposure of said highly polished surfaces is detected by photoelectric scanners 107 and 108. The electrical impulse thus generated is caused to operate solenoid valves 110 and 111, respectively, which form part of the hydraulic system. The opening of said solenoid valves permits hydraulic fluid to flow into the upper left hand hydraulic cylinder 102 through conduits generally indicated by reference numeral 112. The hydraulic fluid also flows into the lower right hand hydraulic cylinder 102 through conduits generally indicated by reference numeral 113. Under the pressure of the hydraulic fluid in cylinders 102 shafts 98 and 96 pivot and cause training rolls 92 and 94 to bring belts 23 and 22 back into register in a neutral position. Similarly, any tracking of upper belt 22 to the right will cause a current to be generated in photoelectric scanners 114 and 115 which will act on solenoid valves 116 and 117, the resulting flow of hydraulic fluid causing training rolls 91 and 93 to force belts 22 and 23 into register. Should belts 22 and 23 both track to the left simultaneously, said belts will come into contact with micro-switch 118 which causes solenoid valves 110 and 116 to operate and to bring the training rolls 91 and 94 into play. Similarly, any simultaneous tracking of both belts to the right will operate micro-switch 120 causing solenoid valves 111 and 117 to operate and bring training rolls 92 and 93 into operation to force the belts into correct position. The hydraulic fluid is stored in a tank 121 as shown in Fig. 1.

Figure 7:
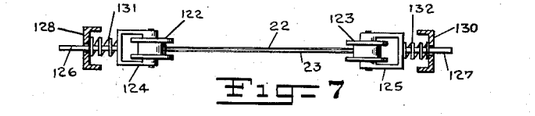
Fig. 7 is an end view of a spring-loaded mechanical training means supplementing the training means shown in Fig. 6.

In addition to the photoelectric scanning arrangement for maintaining belts 22 and 23 in register, additional mechanical guide means are also provided as shown in Fig. 7. This guide means comprises a pair of grooved rollers 122 and 123 rotatably mounted on brackets 124 and 125 which are supported by rods 126 and 127 respectively. These rods are slidably mounted in channel iron supports 128 and 130 which are members of the supporting frame of the belt polishing apparatus. Rollers 122 and 123 are spring-pressed by means of coil springs 131 and 132 which are set on the rods 126 and 127 so that the rollers 122 and 123 will remain in contact with and control any tendency of belts 22 and 23 to track or move laterally. The entire novel belt training means provided holds any movement of either belt 22 or 23, or both, to an absolute minimum and greatly reduces the chance of any surface distortion of the thermoplastic sheet material being polished due to the relative movement between said belts.

Figure 8:
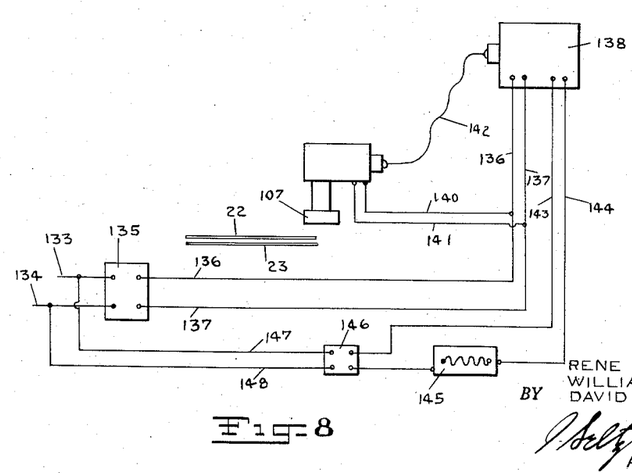
Fig. 8 is a schematic wiring diagram of the electrical circuit of the hydraulically-operated belt training means.

A schematic diagram of the electrical circuit provided for each of said photoelectric scanners and solenoid operated valves in the hydraulic system is shown in Fig. 8. The circuit is identical for each of the photoelectric scanners and solenoid-operated valves provided. Accordingly, in the interest of clarity, only one is shown. The power input to the circuit is taken by leads 133 and 134 from a 110 volt, 60 cycle alternating current power source. Leads 133 and 134 are connected to a switch 135 and leads 136 and 137 coming from switch 135 are connected to an amplifier 138 of the usual construction containing the usual electronic elements (not shown). Take-off leads 140 and 141 supply the necessary power input to the photoelectric scanner 107. Any electrical impulse generated in photoelectric scanner 107 because of a tracking of polishing belts 22 and 23 with a consequent reflection of light into the light-sensitive cell of said scanner 107 is fed to amplifier 138 by means of a lead 142. Leads 143 and 144 take the amplified current from amplifier 138 and this amplified current actuates a relay (not shown) internal to amplifier 138 which permits current to flow through lead 144 actuating solenoid 145. Solenoid 145 is operatively connected by suitable means (not shown) to the valve 110 of the hydraulic system actuating training roller 94. A switch 146 is also provided for further control of the circuit, leads 147 and 148 from said switch being connected to leads 133 and 134.

Figure 9:
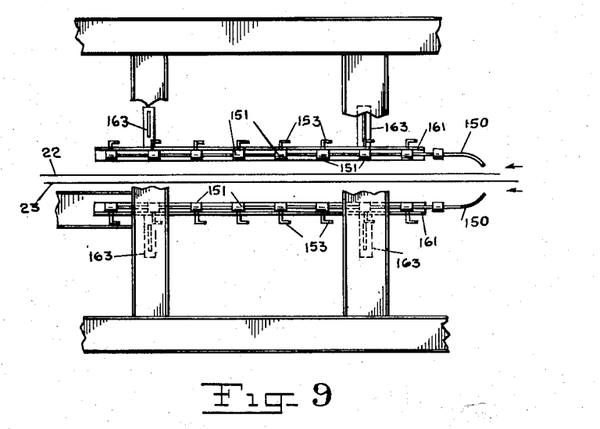
Fig. 9 is a side-elevational view of belt cooling means.
Figure 10:
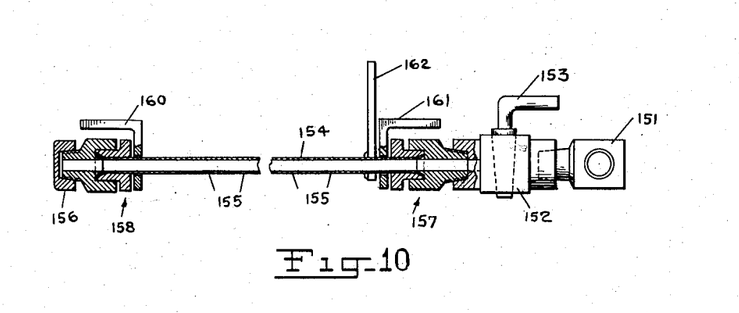
Fig. 10 is a cross-sectional view of a portion of said cooling means.

To ensure satisfactory polishing and stripping of the thermoplastic sheet material being processed suitable means are provided, as shown in Figs. 9 and 10, for controllably cooling belts 22 and 23 and thereby the polished thermoplastic sheet material prior to the stripping and discharge of the latter from the belts. The cooling is effected by means of a controlled flow of cool air under pressure. The cool air, coming from any suitable source, enters a manifold tube 150 which is connected by means of separate fittings 151 to a plurality of valves or cocks 152 each of which is individually and manually controlled by valve stem handles 153. Each of the valves 152 communicates with a series of parallel tubes 154 provided with spaced, laterally disposed, perforations 155. Tubes 154 are sealed at their ends by caps 156 and are secured in rotary couplings 157 and 158. The tubes 154 are supported by angle irons 160 and 161. Tubes 154 may be rotated through an angle of about 90° by means of levers 162 so that the direction of the flow of air against belt 22 may be varied. A compete and identical cooling unit is also provided for controllably cooling lower belt 23. By suitably varying the volume as well as the direction of the compressed air flow the rate of cooling may be adjusted to any desired degree. The banks of tubing constituting the separate belt cooling units may be adjusted vertically by raising or lowering the tube banks on slotted standards 163 which are integral with angles 160 and 161.

We have found, furthermore, that an important factor in the production of sheet materials having highly polished and uniform surfaces is dependent not only upon maintaining the polished outer surfaces of polishing belts 22 and 23 which come in contact with the thermoplastic sheet material free of dirt and foreign particles but, equally important, upon maintaining the inner, unpolished surfaces of said belts 22 and 23 just as completely dirt-free. Any foreign particles on the inner belt surface tends to have a distorting effect on the surface of the thermoplastic sheet material when the same are trapped between the polishing belts and the surface of the pulleys driving said belts. Accordingly, as shown in Fig. 2, there is provided suitable cleaning means for the inner surface of each of said belts.

The cleaning means consists of a pair of adjustable scraping blades 164 and 165 which are maintained in contact with the inner surface of said belts 22 and 23 so as to remove any gross foreign particles which may adhere to said surfaces. Situated behind scraping blade 164 is a rotating brush 166 driven by suitable means (not shown) and in the direction indicated by the arrows for removing any fine particles of dust or dirt which as freed are drawn into a suction nozzle 167. A driven brush 168 and a suction nozzle 170 are also provided adjacent to scraper blade 165 to remove any particles of dirt not removed by said scraper blade. In order to ensure complete removal of dirt and foreign material from the inner surface of belt 22 before it comes in contact with pulley 24, a brush 171 is also provided, having a suction nozzle 172 closely adjacent thereto to draw away the dirt thus separated. A second auxiliary brush 173 and suction nozzle 174 is provided for the thorough cleansing of the inside surface of belt 23.

In order to gain access to the extrusion head 21 for periodic cleaning and adjustment, suitable means are provided for moving the entire belt polishing apparatus in a lateral direction away from the discharge end of the extruder, such as a plurality of casters 175, fixed to a beam 176 which constitutes a part of the lower frame of the polishing apparatus, adapted to roll in trackways 177. Normally, however, when the belt polishing apparatus is in operative position it must be very firmly anchored to eliminate any possibility of lateral movement. To this end there are provided lifting means to raise the belt polishing apparatus off the casters. The lifting means comprises a plurality of jacks 178 consisting of a screw 180 and a crank handle 181 attached thereto the rotation of which acts to raise or lower entire assembly so that the weight thereof may be transferred from casters 175 to supporting blocks 182 and vice versa. Thus, when it is desired to gain access to the extrusion head 21, crank handles 181 are rotated in a counter-clockwise direction until casters 175 bear the full weight of the apparatus and the latter may then, after the weights 70 and 75 are disengaged, be rolled away until it clears extrusion head 21.

Weights 70 and 75 must be disengaged due to the fact that the pit 183, containing said weights, although quite deep is usually only large enough in its other dimensions, for practical reasons, to accommodate the tension weights 70 and 75 and does not provide sufficient clearance to allow any extensive movement or maneuvering of the weights therein.

Since weights 70 and 75 are employed to maintain belts 22 and 23 under tension and the development of any slack in said belts is wholly undesirable except when the same are to be removed from the drive and idler pulleys, suitable locking means adapted to maintain said belts under tension when the tension weights 70 and 75 are disengaged is provided. Thus, in order to disengage tension weight 70 without allowing any slack to form in belt 22 a locking means generally indicated by reference numeral 184 is brought into operation. Locking means 184 comprises a screw 185, having a handle 186 fixed thereto, threaded through a bracket 187 which is slidably mounted on a beam 188, which forms a portion of the framework of the apparatus. Screw 185 is also provided with a foot 190 seated in a channel 191 integral with the upper section of cradle 59. A set screw 192 threaded through a sleeve 193 fixed to beam 188 is also provided as an integral part of the locking means.

Normally, when the belt polishing apparatus is in operation the tension on belt 22 is a floating tension and is maintained entirely by the pull of weight 70, screw 185 having been turned through a sufficient number of revolutions so that foot 190 is raised until it clears channel 191. When it is desired to disengage the tension weight 70, for example, the position of slidably mounted bracket 187 is so adjusted by rotating the set screw 192 that when handle 186 is turned in a clockwise direction the foot 190 will move downwardly and register in channel 191. Thus, belt 22 is locked in tensioned position and no slack can develop. The block and tackle 85 are then brought into operation, the weight 70 raised thereby and the cable 71 disengaged therefrom. The locking means thus maintains belt 22 under tension although the tension weight 70 is in an inoperative position. Similarly, by the engagement of the tension locking means generally indicated by reference numeral 194, belt 23 may be locked in tensioned position, the weight 75 lifted by the block and tackle 87, and the cable 76 disengaged. With both tension weights thus supported in the pit 183, the jacks 178 may be operated by the jack crank handles 181, the apparatus set down on the casters 175 and then rolled away along the trackways 177 thus freeing extrusion head 21 for service.

In this position, the belt 22 and 23 may also be removed if desired. In order to protect the highly polished surfaces of belts 22 and 23 during transportation to and from the polishing apparatus and during storage, a carriage, generally indicated by reference numeral 195 is employed as shown in Figs. 11 and 12. The carriage 195 comprises a structural steel frame 196 set on casters 197 which frame carries a pair of large rolls 198 and 200 rotatably mounted on shafts 201 and 202. The steel frame 196 has a bracket 203 integral therewith which may be secured to a part of frame 204 of the polishing apparatus by a pin 205 during belt transfer operations. In order to transfer belt 22, for example, to the rolls 198 and 200, the set screw 192 is rotated to permit some slack in belt 22, pulleys 24 and 25 are removed from their bearings and the shaft 46 of pulley 24 is inserted in the roll 198 while the shaft 58 of the pulley 25 is inserted into the roll 200. The belt 22 is then lifted off pulleys 24 and 25 on to rolls 198 and 200. The carriage 195 is detached from the frame 204 by removing a pin 205 and the carriage then propelled on the casters 197 to storage. The pulleys 24 and 25 may be lifted from their bearing by means of a suitable hoist 206. Removal and/or replacement of the polishing belts 23 is effected in the same fashion.

The sheet materials which may be polished in accordance with the novel process of our invention and employing our novel belt polishing apparatus may have a basis of any suitable thermoplastic material. Examples of suitable thermoplastic materials are organic derivatives of cellulose including cellulose esters such as cellulose nitrate, cellulose acetate, cellulose propionate, cellulose butyrate, cellulose acetate-propionate, cellulose-acetate-butyrate, cellulose ethers such as ethyl cellulose and benzyl cellulose, synthetic linear polyamide condensation products, vinyl compounds and vinyl copolymers such as polyvinyl chloride, polyvinyl acetate, vinylidene chloride, polyvinyl alcohol, polymethyl-methacrylate, polystyrene, etc.

The thermoplastic materials may be suitably plasticized in order to impart the desired physical characteristics to the extruded sheet materials formed in accordance with our process. Examples of plasticizers which may be employed alone or in admixture are dimethyl phthalate, ethyl phthallyl, ethyl glycollate, triacetin, tripropionin, triphenyl phosphate, ethylene toluene sulfonamide, tricresyl phosphate, dibutyl tartrate, dibutyl phthalate, dibutyl sebacate and mineral oil.

We have found, furthermore, that in order to effect a suitable polishing of the sheet materials the temperature gradient maintained along the polishing belts must be carefully and accurately controlled in relation to the Olsen flow test temperatures (A. S. T. M. D569-43) of the thermoplastic material being extruded. Thus, the temperature of the polishing belts where the extruded sheet material is received should be from about 10 to 25° C. higher than the Olsen flow test temperature. At about the center of the belts, the cooling means should be so adjusted that the temperature is maintained at from about 10° above to no less than about 10° below the Olsen flow test temperature. At the stripping point where the polished thermoplastic sheet material is discharged, the temperature should be at least 50° C. below the Olsen flow temperature. When temperatures lower than indicated are employed, a sufficiently satisfactory polish is not obtained, while at higher temperatures it is difficult to strip the sheet from the belt surfaces without forming wrinkles and distorting the polished surfaces.

In order further to illustrate our invention but without being limited thereto the following examples are given:

*Example I*

100 parts by weight of cellulose acetate flake having an acetyl value of about 56%, calculated as acetic acid, is thoroughly mixed with 50 parts by weight of dimethyl phthalate and the composition converted to a molding powder. The thermoplastic composition obtained has an Olsen flow test temperature of 120° C. The molding powder is fed to a suitable extruder and is continuously extruded in sheet form, the extrusion head being maintained at about 200° C. The extruded plastic sheet material is continuously fed between heated, endless highly polished belts, the belts being heated to a temperature of 132° C. at the point where they receive the sheet material. The thermoplastic sheet is carried along between said belts which are cooled gradually so that they are at a temperature of 116° C. at about the midpoint of their travel and at a temperature of about 60° C. at the point at which they separate and the polished cellulose acetate sheet material is discharged. A smooth, even and highly polished continuous sheet of cellulose acetate material is obtained.

*Example II*

100 parts by weight of ethyl cellulose, having an ethoxyl value of about 45.3%, is mixed with 5 parts by weight of refined mineral oil and the composition converted to a molding powder. The thermoplastic composition obtained has an Olsen flow test temperature of 161° C. The molding powder is fed to a suitable extruder and is continuously extruded in sheet form, the extrusion head being maintained at about 222° C. The plastic sheet material is continuously fed between heated, endless highly polished belts, the belt being heated to a temperature of 177° C. at the point where they receive the sheet material. The thermoplastic sheet is carried along between said belts which are cooled gradually so that they are at a temperature of about 154° C. at the midpoint of their travel and at a temperature of 104° C. at the point which they separate and the ethyl cellulose sheet material is discharged. A smooth, even and highly polished continuous sheet of ethyl cellulose material is obtained.

It is to be understood that the foregoing detailed description is given merely by way of illustration and that many variations may be made therein without departing from the spirit of our invention.

Having described our invention, what we desire to secure by Letters Patent is:

1. Apparatus for polishing continuous thermoplastic sheet materials, comprising a pair of superimposed, positively driven, endless polished belts adapted to receive and grip the thermoplastic sheet material therebetween, means including a rotatably mounted heated driven pulley and a rotatably mounted heated idler pulley around which said belts are passed for heating and simultaneously driving said belts at a uniform linear speed, belt training means cooperating with each of said belts for restricting any relative lateral movement between said endless, driven belts, and cooling means intermediate of said drive and idler pulleys and adjacent to said heated belts for controlling the temperature of said belts, the cooperation of parts being such as to cause the thermoplastic sheet material to be forwarded, the surfaces thereof to be shaped and polished between the heated belt surfaces and the polished thermoplastic sheet material continuously discharged from between said belts.

2. Apparatus for polishing continuous thermoplastic sheet materials, comprising a pair of superimposed, positively driven, endless polished, belts adapted to receive and grip the thermoplastic sheet material therebetween, means including a rotatably mounted heated driven pulley and a rotatably mounted heated idler pulley around which said belts are passed for heating and simultaneously driving said belts at a uniform linear speed means cooperating with said drive pulleys and idler pulleys for varying the distance between said belts, belt training means cooperating with each of said belts for restricting any relative lateral movement between said endless, driven belts, and cooling means intermediate of said belt and idler pulleys and adjacent to said belts for controlling the temperature of said belts, the cooperation of parts being such as to cause the thermoplastic sheet material to be forwarded, the surfaces thereof to be shaped and polished between the heated belt and the polished thermoplastic sheet material continuously discharged from between said belts.

3. Apparatus for polishing continuous thermoplastic sheet materials, comprising a pair of superimposed, endless driven belts adapted to receive and grip the extruded thermoplastic sheet material therebetween, means including a rotatably mounted heated driven pulley and a rotatably mounted heated idler pulley around which said belts are passed for heating and simultaneously driving said belts at a uniform linear speed, belt tensioning means cooperating with each of said idler pulleys for maintaining said belt taut, means cooperating with said drive pulleys and idler pulleys for varying the distance between said belts, belt training means cooperating with each of said belts for restricting any relative lateral movement between said endless, driven belts, and cooling means intermediate of said drive and idler pulleys and adjacent to said belts for controlling the temperature of said heated belts, the cooperation of parts being such as to cause the thermoplastic sheet material to be forwarded, the surfaces thereof to be shaped and polished between the heated belt surfaces and the polished thermoplastic sheet material continuously discharged from between said belts.

4. In apparatus for polishing continuous thermoplastic sheet materials extruded from an extrusion head provided with a slit-shaped orifice from which a continuous sheet of thermoplastic material is extruded, a pair of superimposed, endless driven belts adapted to receive and grip the extruded thermoplastic sheet material therebetween, means including a rotatably mounted heated driven pulley and a rotatably mounted heated idler pulley around which said belts are passed for heating and simultaneously driving said belts at a uniform linear speed, belt tensioning means cooperating with each of said idler pulleys for maintaining said belts taut, means cooperating with said driven pulleys and idler pulleys for varying the distance between said belts, belt training means including a pair of oppositely-disposed spring-pressed guide rollers each simultaneously in rolling contact with the running edges of both belts where the same are in polishing relationship for restricting any relative lateral movement between said endless, driven belts, and cooling means intermediate of said drive and idler pulleys and adjacent to said belts for controlling the temperature of said belts, the cooperation of parts being such as to cause the thermoplastic material to be carried from the extrusion head as formed, the surfaces thereof to be shaped and polished between the heated belt surfaces and the polished thermoplastic sheet material continuously discharged from between said belts.

5. In apparatus for polishing continuous thermoplastic sheet materials extruded from an extrusion head provided with a slit-shaped orifice from which a continuous sheet of thermoplastic material is extruded, a pair of superimposed, endless driven belts adapted to receive and grip the extruded thermoplastic sheet material therebetween, means including a rotatably mounted heated driven pulley and a rotatably mounted heated idler pulley around which said belts are passed at a uniform linear speed, belt tensioning means cooperating with each of said idler pulleys for maintaining said belts taut, means cooperating with said drive pulleys and idler pulleys for varying the distance between said belts, belt training means including a pair of oppositely-disposed spring-pressed guide rollers each simultaneously in rolling contact with the running edges of both belts where the same are in polishing relationship for restricting any relative lateral movement between said endless, driven belts, a plurality of hydraulically-pressed rollers each in rolling contact with a free edge of said belts, photoelectric means responsive to any relative lateral displacement of said belts operatively connected to each of said hydraulically pressed rollers and adapted to move the same upon relative lateral displacement of the belts to return the latter to a neutral position, and cooling means intermediate of said drive and idler pulleys and adjacent to said belts for controlling the temperature of said belts, the cooperation of parts being such as to cause the thermoplastic sheet material to be carried from the extrusion head as formed, the surfaces thereof to be shaped and polished between the heated belt surfaces and the polished thermoplastic sheet material continuously discharged from between said belts.

6. In apparatus for polishing continuous thermoplastic sheet materials extruded from an extrusion head provided with a slit-shaped orifice from which a continuous sheet of thermoplastic material is extruded, a pair of superimposed, endless driven belts adapted to receive and grip the extruded thermoplastic sheet material therebetween, means including a rotatably mounted heated driven pulley and a rotatably mounted heated idler pulley around which said belts are passed for heating and simultaneously driving said belts at a uniform linear speed, belt tensioning means cooperating with each of said idler pulleys for maintaining said belts taut, means cooperating with said drive pulleys and idler pulleys for varying the distance between said belts, belt training means including a pair of oppositely-disposed spring-pressed guide rollers each simultaneously in rolling contact with the running edges of both belts where the same are in polishing relationship for restricting any relative lateral movement between said endless, driven belts, a plurality of hydraulically-pressed rollers each in rolling contact with a free edge of said belts, photoelectric means responsive to any relative lateral displacement of said belts operatively connected to each of said hydraulically pressed rollers and adapted to move the same upon relative lateral displacement of the belts to return the latter to a neutral position, and cooling means intermediate of said drive and idler pulleys and adjacent to said belts for controlling the temperature of said belts comprising a plurality of axially rotatable, valved perforated tubes through which cool air in the desired volume and at the desired incident angle may be directed against the heated belt surfaces, the cooperation of parts being such as to cause the thermoplastic sheet material to be carried from the extrusion head as formed, the surfaces thereof to be shaped and polished between the heated belt surfaces and the polished thermoplastic sheet material continuously discharged from between said belts.

7. Process for the production of continuous, highly polished sheets having a basis of a thermoplastic material, which comprises continuously extruding a thermoplastic material in sheet form, and feeding the thermoplastic material in a plastic condition between differentially heated, polished moving surfaces, the temperature gradient of said heated polished surfaces being so controlled that the temperature at the point of entry of the thermoplastic material between the polished surfaces is from about 10 to about 25° C. higher than the Olsen flow test temperature of the thermoplastic material, the temperature at an intermediate point is from about 10° C. above to about 10° C. below said Olsen flow test temperature, and the temperature at the point of discharge of the thermoplastic material from between the polished surfaces is at least 50° C. below said Olsen flow test temperature.

8. Process for the production of continuous, highly polished sheets having a basis of a thermoplastic cellulose derivative material which comprises continuously extruding a thermoplastic cellulose derivative material in sheet form, and feeding the thermoplastic material in a plastic condition between differentially heated, polished moving surfaces, the temperature gradient of said heated polished surfaces being so controlled that the temperature at the point of entry of the thermoplastic cellulose derivative material between the polished surfaces is from about 10 to about 25° C. higher than the Olsen flow test temperature of the thermoplastic cellulose derivative material, the temperature at an intermediate point is from about 10° C. above to about 10° C. below said Olsen flow test temperature, and the temperature at the point of discharge of the thermoplastic cellulose derivative material from between the polished surfaces is at least 50° C. below said Olsen flow test temperature.

9. Process for the production of continuous, highly polished sheets having a basis of a thermoplastic cellulose acetate material, which comprises continuously extruding a thermoplastic cellulose acetate material in sheet form, and feeding the thermoplastic material in a plastic condition between differentially heated, polished moving surfaces, the temperature gradient of said heated polished surfaces being so controlled that the temperature at the point of entry of the thermoplastic cellulose acetate material between the polished surfaces is from about 10 to about 25° C. higher than the Olsen flow test temperature of the thermoplastic cellulose acetate material, the temperature at an intermediate point is from about 10° C. above to about 10° C. below said Olsen flow test temperature, and the temperature at the point of discharge of the thermoplastic cellulose acetate material from between the polished surfaces is at least 50° C. below said Olsen flow test temperature.

10. Process for the production of continuous, highly polished sheets having a basis of a thermoplastic ethyl cellulose material, which comprises continuously extruding a thermoplastic ethyl cellulose material in sheet form, and feeding the thermoplastic material in a plastic condition between differentially heated, polished moving surfaces, the temperature gradient of said heated polished surfaces being so controlled that the temperature at the point of entry of the thermoplastic ethyl cellulose material between the polished surfaces is from about 10 to about 25° C. higher than the Olsen flow test temperature of the thermoplastic ethyl cellulose material, the temperature at an intermediate point is from about 10° C. above to about 10° C. below said Olsen flow test temperature, and the temperature at the point of discharge of the thermoplastic ethyl cellulose material from between the polished surfaces is at least 50° C. below said Olsen flow test temperature.

RENE P. PIPEROUX.
WILLIAM P. MOELLER.
DAVID B. HERTZ.

REFERENCES CITED

The following references are of record in the file of this patent:

UNITED STATES PATENTS

| Number | Name | Date |
| --- | --- | --- |
| 860,617 | Wood | July 16, 1907 |
| 986,162 | Gare | Mar. 7, 1911 |
| 2,039,271 | Bierer | Apr. 28, 1936 |
| 2,075,735 | Loomis | Mar. 30, 1937 |
| 2,316,173 | Kratz | Apr. 13, 1943 |
| 2,319,099 | Abramson et al. | May 11, 1943 |
| 2,383,896 | Taber | Aug. 28, 1945 |
| 2,442,443 | Swallow | June 1, 1948 |